United States Patent
Schweiger et al.

(10) Patent No.: US 12,172,935 B2
(45) Date of Patent: Dec. 24, 2024

(54) COATED ROOFING MATERIALS

(71) Applicant: OWENS CORNING INTELLECTUAL CAPITAL, LLC, Toledo, OH (US)

(72) Inventors: Scott Schweiger, Newark, OH (US); Jonathan Verhoff, Granville, OH (US); Jesse Gadley, Newark, OH (US)

(73) Assignee: Owens Corning Intellectual Capital, LLC, Toledo, OH (US)

( * ) Notice: Subject to any disclaimer, the term of this patent is extended or adjusted under 35 U.S.C. 154(b) by 915 days.

(21) Appl. No.: 16/694,068

(22) Filed: Nov. 25, 2019

(65) Prior Publication Data
US 2020/0354282 A1 Nov. 12, 2020

Related U.S. Application Data

(60) Provisional application No. 62/846,204, filed on May 10, 2019.

(51) Int. Cl.
*E04D 5/12* (2006.01)
*C04B 14/42* (2006.01)
(Continued)

(52) U.S. Cl.
CPC .............. *C04B 41/63* (2013.01); *C04B 14/42* (2013.01); *C04B 26/26* (2013.01); *C04B 41/009* (2013.01);
(Continued)

(58) Field of Classification Search
CPC ......... C04B 41/63; C04B 14/42; C04B 26/26; C04B 41/009; C04B 41/4539;
(Continued)

(56) References Cited

U.S. PATENT DOCUMENTS 6,296,912 B1 10/2001 Zickell
6,531,200 B2 3/2003 Zickell et al.
(Continued)

FOREIGN PATENT DOCUMENTS

CA 2515231 A1 8/2004
CA 2559078 A1 9/2005
(Continued)

OTHER PUBLICATIONS

Fisch et al., "Study of Additive Compatibility with Poly(Vinyl Chloride) (PVC).2: Dynamic Mechanical Analysis of PVC Lubrication by Stearic Acid and Its Derivatives," Journal of Vinyl & Additive Technology, Mar. 1998, vol. 4, No. 1, pp. 4-11.
(Continued)

*Primary Examiner* — Nathan L Van Sell
(74) *Attorney, Agent, or Firm* — Calfee, Halter & Griswold LLP

(57) ABSTRACT

A roofing membrane is provided that includes at least one substrate at least partially impregnated with a first asphalt coating composition and a liquid parting agent emulsion applied to the upper surface of the asphalt-coated substrate. The liquid parting agent emulsion comprises one or more thermoplastic polymers and about 15 wt. % to about 40 wt. % of at least one mineral filler, based on the weight of the total solids in the emulsion. The first asphalt coating composition is free of oxidized asphalt.

17 Claims, 5 Drawing Sheets

(51) Int. Cl.
| | |
|---|---|
| C04B 26/26 | (2006.01) |
| C04B 41/00 | (2006.01) |
| C04B 41/45 | (2006.01) |
| C04B 41/48 | (2006.01) |
| C04B 41/63 | (2006.01) |
| C04B 111/00 | (2006.01) |
| E04D 1/00 | (2006.01) |
| E04D 1/20 | (2006.01) |
| E04D 1/26 | (2006.01) |
| E04D 5/02 | (2006.01) |

(52) U.S. Cl.
CPC ...... *C04B 41/4539* (2013.01); *C04B 41/4861* (2013.01); *C04B 41/4876* (2013.01); *E04D 5/02* (2013.01); *E04D 5/12* (2013.01); *C04B 2111/00586* (2013.01); *E04D 2001/005* (2013.01); *E04D 1/20* (2013.01); *E04D 1/26* (2013.01)

(58) Field of Classification Search
CPC ............ C04B 41/4861; C04B 41/4876; C04B 2111/00586; C04B 2111/00612; E04D 5/02; E04D 5/12; E04D 1/20; E04D 1/26; E04D 2001/005; E04D 5/10; Y02W 30/91
See application file for complete search history.

(56) References Cited

U.S. PATENT DOCUMENTS

| | | |
|---|---|---|
| 6,696,125 B2 | 2/2004 | Zanchetta et al. |
| 6,925,766 B2 | 8/2005 | Di Pede |
| 7,115,313 B2 | 10/2006 | Zanchetta et al. |
| 7,132,143 B2 | 11/2006 | Zanchetta et al. |
| 7,368,155 B2 | 5/2008 | Larson et al. |
| 7,595,356 B2 | 9/2009 | Lommerts et al. |
| 7,776,417 B2 | 8/2010 | Mohseen et al. |
| 7,977,259 B2 | 7/2011 | Ratcliff et al. |
| 8,003,717 B2 | 8/2011 | Bobee et al. |
| 8,034,172 B2 | 10/2011 | Naidoo et al. |
| 8,609,213 B2 | 12/2013 | Wiercinski et al. |
| 9,133,612 B2 | 9/2015 | Wiercinski et al. |
| 9,376,565 B2 | 6/2016 | Subotic et al. |
| 9,527,970 B2 | 12/2016 | Pochert |
| 9,688,883 B2 | 6/2017 | Subotic et al. |
| 9,702,148 B2 | 7/2017 | Zickell et al. |
| 9,834,935 B2 | 12/2017 | Loftus et al. |
| 9,909,031 B1 | 3/2018 | Bruns et al. |
| 9,932,739 B2 | 4/2018 | Verhoff et al. |
| 10,138,633 B2 | 11/2018 | Khan et al. |
| 10,267,049 B2 | 4/2019 | Wiercinski et al. |
| 10,370,852 B2 | 8/2019 | Verhoff et al. |
| 2005/0250399 A1 | 11/2005 | Kuhn et al. |
| 2006/0199453 A1 | 9/2006 | Kuhn et al. |
| 2006/0243388 A1 | 11/2006 | Kubiak et al. |
| 2007/0071946 A1 | 3/2007 | Zickell et al. |
| 2007/0137130 A1 | 6/2007 | Zickell et al. |
| 2007/0199476 A1 | 8/2007 | Bobee et al. |
| 2008/0255277 A1 | 10/2008 | Bobee et al. |
| 2009/0317579 A1 | 12/2009 | Mohseen et al. |
| 2010/0119784 A1 | 5/2010 | Zickell et al. |
| 2010/0147190 A1 | 6/2010 | Naidoo et al. |
| 2010/0173110 A1 | 7/2010 | Wiercinski et al. |
| 2010/0233408 A1 | 9/2010 | Zickell et al. |
| 2010/0326598 A1* | 12/2010 | Atwater ................ C09J 153/02 524/505 |
| 2011/0281094 A1 | 11/2011 | Zanchetta et al. |
| 2012/0180933 A1 | 7/2012 | Wiercinski et al. |
| 2013/0065020 A1 | 3/2013 | Loftus et al. |
| 2013/0225020 A1* | 8/2013 | Flood ....................... C08K 3/20 524/505 |
| 2013/0337162 A1* | 12/2013 | Wiercinski ................ E04B 1/66 427/177 |
| 2015/0239005 A1* | 8/2015 | Humphreys .............. E04D 1/20 428/489 |
| 2017/0073531 A1 | 3/2017 | Zhou et al. |
| 2017/0137717 A1 | 5/2017 | Palmer et al. |
| 2018/0119424 A1 | 5/2018 | Khan et al. |
| 2018/0155931 A1 | 6/2018 | Loftus et al. |
| 2019/0071587 A1 | 3/2019 | Yuan et al. |
| 2019/0184678 A1 | 6/2019 | LaTorre et al. |
| 2019/0184679 A1 | 6/2019 | LaTorre et al. |
| 2019/0185712 A1 | 6/2019 | LaTorre et al. |
| 2019/0186140 A1 | 6/2019 | LaTorre et al. |
| 2019/0186141 A1 | 6/2019 | LaTorre et al. |
| 2019/0186142 A1 | 6/2019 | LaTorre et al. |
| 2019/0186143 A1 | 6/2019 | LaTorre et al. |
| 2019/0186144 A1 | 6/2019 | LaTorre et al. |
| 2019/0330850 A1 | 10/2019 | Verhoff et al. |

FOREIGN PATENT DOCUMENTS

| | | |
|---|---|---|
| CA | 2560082 A1 | 9/2005 |
| CA | 2628679 A1 | 5/2007 |
| CA | 2550172 A1 | 6/2007 |
| CA | 2418498 C | 12/2007 |
| CA | 2689545 A1 | 1/2009 |
| CA | 2308919 C | 2/2010 |
| CA | 2734927 A1 | 9/2011 |
| CA | 2590630 C | 3/2013 |
| CA | 2846615 A1 | 3/2013 |
| CA | 2857557 A1 | 6/2013 |
| CA | 2996483 A1 | 3/2017 |
| CA | 2948726 A1 | 5/2017 |
| CA | 2739552 C | 8/2017 |
| CA | 2728709 C | 1/2018 |
| CA | 3027820 A1 | 6/2019 |
| CA | 2982177 C | 8/2019 |
| WO | 2010048198 A1 | 4/2010 |
| WO | 2011041263 A1 | 4/2011 |
| WO | 2016008115 A1 | 1/2016 |
| WO | 2017035182 A1 | 3/2017 |
| WO | 2019041049 A1 | 3/2019 |
| WO | 2019118958 A2 | 6/2019 |

OTHER PUBLICATIONS

Salmah et al., "Effect Maleic Anhydride Polypropylene on Properties Of Calcium CarbonateFilled Polypropylene/Ethylene Propylene Diene Terpolymer Composites," Key Engineering Materials, 2014, vols. 594-595, pp. 770-774.

Zhang et al., "Chemical Surface Modification of Calcium Carbonate Particles by Maleic Anhydride Grafting Polyethylene Wax," International Journal of Green Nanotechnology: Physics and Chemistry, 2010, 1:2, pp. P65-P71.

Office Action for CA Application No. 3,062,801 dated Dec. 7, 2023.

Office Action for CA Application No. 3,062,801 dated Sep. 16, 2024.

\* cited by examiner

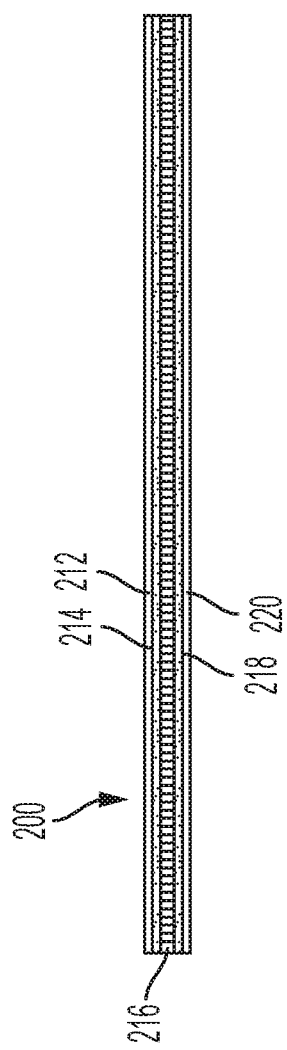
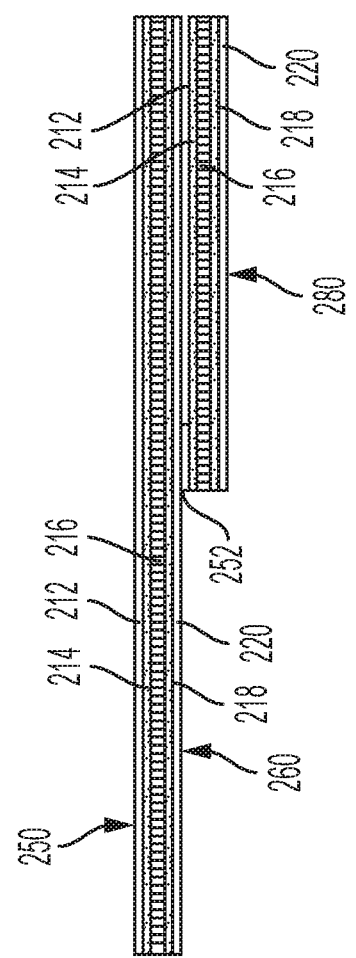

COATED ROOFING MATERIALS

RELATED APPLICATION

This application claims priority to U.S. Provisional Application Ser. No. 62/846,204, filed May 10, 2019, titled COATED ROOFING MATERIALS, the entire disclosure of which is incorporated by reference.

FIELD

The present disclosure relates to roofing materials. In particular, the present disclosure relates to roofing materials, such as underlayments or shingles, that include a layer of a novel liquid parting agent composition.

BACKGROUND

Asphalt-based roofing materials, such as roofing shingles, membranes, underlayments, roll roofing, and commercial roofing, are installed on the roofs of buildings to provide protection from the elements and to give the roof an aesthetically pleasing look. In particular, roofing underlayments are provided predominantly to act as a water and moisture barrier. It is desirable that a roofing underlayment provide a surface which has a sufficient level of "walkability" in order to prevent installers from sticking or slipping during installation or otherwise. It is further desirable the underlayment does not slide underfoot and is dimensionally stable, resistant to tearing, non-adhesive to other layers, and provides hot and cold flexibility.

A variety of roofing underlayment products are commonly used. The two major classes are mechanically attached and self-adhered underlayments, the latter commonly referred to as "peel and stick".

Typically, the roofing material is constructed of a substrate, such as a glass fiber mat or an organic felt, with an asphalt coating on the substrate. Traditionally, the asphalt coating comprises either a coating grade asphalt, or a paving-grade asphalt that has been oxidized or otherwise modified to bring the asphalt properties (such as softening point, penetration, and melt viscosity) in line with coating grade asphalt. Although many roofing materials may include a layer of particulate material (known as a parting agent, inorganic particulate, or backdust material) on the upper and/or lower surface of the substrate, to prevent roll sticking and enhance the walkability of the roof surface, unmodified paving-grade or flux asphalts remain too sticky, even with such parting agents applied to the exposed surface.

Additionally, the particulate material comprises solid particles applied during the manufacturing process to prevent the roofing material from sticking to equipment during production, as well as to prevent the roofing material from sticking together when packaged. The particulate material is abrasive to manufacturing equipment and generally accelerates wear and tear. The amount of particulate applied to the roofing material lacks control such that more particulate than necessary is applied, which can lead to increased amounts of loose particulate in the roofing material packaging and waste.

Thus, it is desirable to develop parting agent compositions that may be applied to softer/stickier asphalt material to allow for a broader variety of asphalt materials, such as paving asphalt and asphalt flux, to be used. It is further desirable to develop particulate material compositions that overcome the above-mentioned shortcomings.

SUMMARY

Various exemplary aspects of the present inventive concepts are directed to a roofing membrane including a substrate at least partially impregnated with a first asphalt coating composition and including an upper surface and a lower surface. The roofing membrane further includes a liquid parting agent emulsion applied to the upper surface of the asphalt-coated substrate. The liquid parting agent emulsion comprises one or more thermoplastic polymers and about 15 wt. % to about 40 wt. % of at least one mineral filler, based on the weight of the total solids in the emulsion. In some exemplary embodiments, the first asphalt coating composition is free of oxidized asphalt.

In some exemplary embodiments, the thermoplastic polymer includes at least one of a polyolefin or a styrene copolymer, such as a maleic anhydride-grafted polyolefin or a styrene maleic anhydride. In some exemplary embodiments, the thermoplastic polymer comprises one or more of a polyethylene or polypropylene emulsion. The thermoplastic polymer may be present in the liquid parting agent emulsion in an amount between about 5% to about 40%, based on the weight of the total solids in the emulsion.

In some exemplary embodiments, the liquid parting agent emulsion further includes a wax.

In some exemplary embodiments, the mineral filler comprises one or more of ground limestone, dolomite, silica, talc, sand, iron salt, titanium, cellulosic materials, fiberglass, calcium carbonate, or combinations thereof. The mineral filler may have an average particle size less than 50 microns.

The liquid parting agent emulsion may further include up to about 3.0 wt. % of a colorant, based on the weight of the total solids in the emulsion. In some exemplary embodiments, the colorant includes one or more of iron oxides, mineral oxides, or carbon black.

The first asphalt coating composition may comprise at least one of paving-grade asphalt or flux. The first asphalt coating composition may further include at least one polymer additive and/or up to about 5.0 wt. % of a thermoplastic hydrocarbon resin, based on the total weight of the asphalt composition. In some exemplary embodiments, the thermoplastic hydrocarbon resin is an aliphatic C5-C9 hydrocarbon resin.

In some exemplary embodiments, the roofing membrane is a roofing underlayment.

Various aspects of the present inventive concepts are further directed to a method of forming a roofing membrane. The method includes at least partially impregnating a substrate with a first asphalt coating composition, the substrate having an upper surface and a lower surface. The method further includes applying a liquid parting agent emulsion to the upper surface of the asphalt-coated substrate. The liquid parting agent emulsion includes one or more thermoplastic polymers and about 15 wt. % to about 40 wt. % of at least one mineral filler, based on the weight of the total solids in the emulsion. In some exemplary embodiments, the first asphalt coating composition is free of oxidized asphalt.

The liquid parting agent emulsion may be applied to the surface of the asphalt-coated substrate as a plurality of liquid droplets.

Yet further aspects of the present inventive concepts are directed to a roofing underlayment that includes a substrate at least partially impregnated with a first asphalt coating composition comprising paving-grade asphalt, the substrate having an upper surface and a lower surface; a liquid parting agent emulsion applied to the upper surface of the asphalt-coated substrate; and a removeable release liner adhered to the lower surface of the substrate. The liquid parting agent emulsion comprises one or more thermoplastic polymers and about 15 wt. % to about 40 wt. % of at least one mineral filler, based on the weight of the total solids in the emulsion. The first asphalt coating composition includes less than 5 wt. % oxidized asphalt.

BRIEF DESCRIPTION OF THE DRAWINGS

FIG. 3 is a side elevational view of a single layer tabbed shingle;

FIG. 4 is a side elevational view of a laminated shingle;

DETAILED DESCRIPTION

Figure 1:
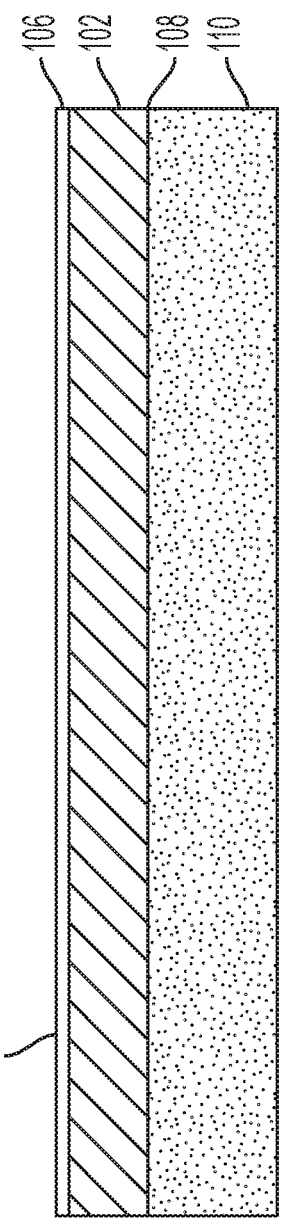
FIG. 1 is a side elevational view of a roofing underlayment comprising a single layer of an asphalt coating composition.

The general inventive concepts will now be described with occasional reference to the illustrated embodiments thereof. The general inventive concepts may, however, be embodied in different forms and should not be construed as limited to the embodiments set forth herein, nor in any order of preference. Rather, the embodiments are provided so that this disclosure will be more thorough, and will convey the scope of the general inventive concepts to those skilled in the art.

Unless otherwise defined, all technical and scientific terms used herein have the same meaning as commonly understood by one of ordinary skill in the art to which this invention belongs. The terminology used in the description is for describing particular embodiments only and is not intended to be limiting of the general inventive concepts. As used in the description and the appended claims, the singular forms "a," "an," and "the" are intended to include the plural forms as well, unless the context clearly indicates otherwise.

Unless otherwise indicated, all numerical values as used in the description and claims are to be understood as being modified in all instances by the term "about." Accordingly, unless otherwise indicated, the numerical values set forth in the description and claims are approximations that may vary depending on the desired properties sought to be obtained in embodiments of the present disclosure. Notwithstanding that the numerical ranges and parameters setting forth the broad scope of the invention are approximations, the numerical values set forth in the specific examples are reported as precisely as possible. Any numerical values, however, inherently contain certain errors necessarily resulting from error found in their respective measurements.

Embodiments are directed, at least in part, to the discovery that a liquid parting agent, such as liquid parting agent emulsion, may be used in place of, or in addition to, traditional parting agents and/or particulate materials, to provide a surface coating on roofing material. In one or more embodiments, the liquid parting agent emulsion may be applied to roofing material, such as a roofing shingle or underlayment, and the heat from the previously applied asphalt coating causes the liquid parting agent emulsion to coalesce to form a coating layer on a surface of the roofing material. Advantageously, roofing materials prepared using the liquid parting agents disclosed herein demonstrate improved surface walkability and reduced roll sticking during production or shipping. Additionally, the liquid parting agents may be utilized with asphalt coating compositions that include asphalt compositions that are softer and stickier than traditional asphalt coating compositions, such as paving-grade asphalt and/or flux. Such has not previously has not been possible, due to the stickiness of the materials even in the presence of a layer of parting agents and/or particulate.

In one or more embodiments, the liquid parting agent emulsion includes an emulsion of polymer(s), wax, or a combination thereof, and a mineral filler. The liquid parting agent emulsion may also include one or more optional additives, such as dispersants, defoaming agents, surfactants, rheology modifiers, biocides, colorants, and the like.

Suitable polymers for use in the liquid parting agent emulsion include thermoplastic polymers, such as polyolefins and styrene copolymers. Suitable monomers for preparing the polyolefins include ethylene, propylene, and combinations thereof. Specific examples of polyolefins include polyethylene, polypropylene, and combinations thereof. In some exemplary embodiments, the polymer comprises a non-ionic polymer emulsion, such as a non-ionic polypropylene emulsion. Additionally, specific styrene copolymers may comprise styrene malic anhydride. In some exemplary embodiments, the liquid parting agent emulsion is free of thermosetting polymers, including thermoset polyurethane polymers, which have been shown to at least partially dissolve in asphalt. Similarly, some exemplary embodiments of the liquid parting agent emulsion are free of polyvinyl acetate and polyvinyl alcohol, which have been shown to produce a roofing surface that is slick when wet.

In one or more embodiments, the amount of thermoplastic polymer in the liquid parting agent emulsion may be described as a percent weight of the polymer based on the weight of the total solids in the emulsified coating. In one or more embodiments, the liquid parting agent emulsion may include about 5% to about 40% polymer, such as about 6.0% to about 30%, or about 8.0% to about 28%, or about 9.0% to about 26%, or about 9.5% to about 25%, or about 9.7% to about 21%, based on the weight of the total solids in the liquid parting agent emulsion. In some exemplary embodiments, the thermoplastic polymer is included in an amount from about 15% to about 22%, based on the weight of the total solids in the liquid parting agent emulsion.

In one or more embodiments, the thermoplastic polymer may be modified or copolymerized with a compatibilizer, such as maleic anhydride. The compatibilizer may act to "compatibilize" or improve the dispersion between the polymer and the mineral filer. Thus, various exemplary embodiments comprise a maleic anhydride-grafted polymer, such as a maleic anhydride-grafted polyolefin. Maleic anhydride-grafted polyolefins are functionalized polyolefins that include one or more maleic anhydride residues (i.e. succinic anhydride groups) bonded to the backbone of the polyolefin. Maleic anhydride-grafted polyolefins may be prepared by forming free radicals on the polyolefin chain and allowing the free radicals to react with the double bond of maleic anhydride. Specific examples of maleic anhydride-grafted polyolefins include, for example, maleic anhydride-grafted polyethylene and maleic anhydride-grafted polypropylene. Alternatively, the thermoplastic polymer may comprise a styrene maleic anhydride polymer, formed from the polymerization of styrene and maleic anhydride polymers In one or more embodiments, the amount of maleic anhydride grafted to the thermoplastic polymer may be characterized by the weight percent of maleic anhydride residues out of the total weight of the maleic anhydride-grafted thermoplastic polymer. The weight percent of maleic anhydride in maleic anhydride-grafted thermoplastic polymer may be determined by any practical method, such as a titration method. In one or more embodiments, the weight percent of grafted maleic anhydride may be greater than 0.01%, in other embodiments greater than 0.1%, and in other embodiments greater than 0.2%. In one or more embodiments, the weight percent of grafted maleic anhydride may be less than 2%, in other embodiments less than 1.0%, in other embodiments less than 0.8%, and in other embodiments less than 0.6%. In one or more embodiments, the weight percent of maleic anhydride in the maleic anhydride-grafted thermoplastic polymer may be from about 0.01% to about 1%, in other embodiments from about 0.1% to about 0.8%, and in other embodiments from about 0.2% to about 0.6%.

As indicted above, the liquid parting agent emulsion may include a wax, as an alternative, or in addition to, the polymer disclosed above. Any type of wax, or a mixture of different waxes, capable of functioning as described herein can be used in the method. In some exemplary embodiments, the wax is a high melt point wax, having a melting point of at least 195° F. (about 90.5° C.). When referring to wax testing, the term "melt point" refers broadly to either congealing point or drop melt point, which are defined by ASTM D 938 in the case of congealing point and ASTM D 3954 in the case of drop melt point. Also, wax can be characterized by penetration or hardness (ASTM D5 or ASTM D 1321), density (ASTM D1505), viscosity (ASTM D 4402 or ASTM D88), or acid value (ASTM D 1386).

In some exemplary embodiments, the wax is one or more of a paraffin wax and a non-paraffin wax. Paraffin waxes typically have melting points below 70° C. and have less than 45 carbon atoms. Non-paraffin waxes typically have melting points above 70° C. and have more than 45 carbon atoms. The non-paraffin wax can be one or more of a natural wax, a modified natural wax, a partial synthetic wax, and a full synthetic wax. Non-limiting examples of suitable partial and fully synthetic waxes include ethylene bis-stearamide wax (EBS), Fischer-Tropsch wax (ET), oxidized Fischer-Tropsch wax (FTO), stearic acid pitch, polyolefin waxes such as polyethylene wax (PE), oxidized polyethylene wax (PEO), polypropylene wax, polypropylene/polyethylene wax, alcohol wax, silicone wax, petroleum waxes such as microcrystalline wax, and chlorinated wax. Any suitable mixtures of different waxes can also be used. In some exemplary embodiments, the wax is a non-paraffinic wax with a high melting point (greater than 70° C.). In various exemplary embodiments, the wax has a melting point of at least 100° C., such as at least 120° C., or at least 130° C., or at least 140° C.

In one or more embodiments, the amount of the wax in the liquid parting agent emulsion may be described as a percent weight of the wax based on the weight of the total solids in the liquid parting agent emulsion. In one or more embodiments, the liquid parting agent emulsion may include about 5% to about 40% wax, such as about 6.0% to about 30%, or about 8.0% to about 25%, or about 9.0% to about 22%, or about 9.5% to about 20%, or about 9.7% to about 13% wax, based on the weight of the total solids in the liquid parting agent emulsion. In some exemplary embodiments, the wax is included in an amount from about 10% to about 22%, based on the weight of the total solids in the liquid parting agent emulsion.

As indicated above, the liquid parting agent emulsion includes one or more mineral fillers. Mineral fillers are fine, inorganic particulate matter, such as ground limestone, dolomite or silica, talc, sand, iron salt, titanium, cellulosic materials, fiberglass, calcium carbonate, or combinations thereof. In one or more embodiments, the mineral filler may include a polyvalent metal cation, such as a divalent, trivalent, or tetravalent metal cation. Suitable divalent metal cations include, for example, $Mg^{2+}$, $Ca^{2+}$, $Fe^{2+}$, $Fe^{3+}$, $Ti^{2+}$, $Ti^{4+}$, $Zn^{2+}$, $Mn^{2+}$, and $Co^{2+}$. In one or more exemplary embodiments, the mineral filler comprises calcium carbonate.

In one or more embodiments, the mineral filler may be characterized by an average particle size. In one or more embodiments, the mineral filler has an average particle size that is less than 50 microns, such as less than 10 microns, including from about 0.1 to about 5.0 microns, in other embodiments from about 1.0 to about 4.8 microns, and in other embodiments from about 2.5 to about 4.5 microns, or from about 3 microns to about 4 microns. The filler provides the roofing material with micro surface roughness that helps with the walkability and tack of the roofing membrane surface. Thus, the particle size must be large enough to provide a surface roughness, but small enough that the particles stay in suspension.

In one or more embodiments, the amount of mineral filler in the liquid parting agent emulsion may be described as a percent weight of the mineral filler based on the weight of the total solids in the liquid parting agent emulsion. In one or more embodiments, the liquid parting agent emulsion may include about 5% to about 40% mineral filler, including about 8% to about 35% mineral filler, about 10% to about 30% mineral filler, about 13% to about 27% mineral filler, about 15% to about 25%, and about 18% to about 23% mineral filler, based on the weight of the total solids in the liquid parting agent emulsion. Alternatively, the liquid parting agent emulsion may be free of any mineral filler.

In one or more embodiments, the liquid parting agent emulsion may optionally include a dispersant. In these embodiments, the liquid parting agent emulsion may include about 0% to about 1.0%, in other embodiments from about 0.01% to about 0.8%, and in other embodiments from about 0.1% to about 0.5% dispersant based on the weight of the total solids in the liquid parting agent emulsion. Suitable examples of dispersants include olefinic dispersants, fatty derivative, acrylic copolymer, and surfactants, such as non-ionic surfactants, including alcohol ethoxylates.

In one or more embodiments, the liquid parting agent emulsion may optionally include a defoaming agent. In these embodiments, the liquid parting agent emulsion may include 0% to about 5% defoaming agent based on the weight of the total solids in the liquid parting agent emulsion. Suitable examples of defoaming agents include siloxanes, mineral oils, and polyoxalkylenes.

In one or more embodiments, the liquid parting agent emulsion may optionally include a colorant. In these embodiments, the liquid parting agent emulsion may include 0% to about 3%, in other embodiments from about 0.01% to about 2%, and in other embodiments from about 0.1% to about 1.5% colorant based on the weight of the total solids in the emulsified coating. Suitable examples of colorants include, for example, metal oxides, such as iron oxides; mineral oxides; and carbon black.

Unexpectedly, it has been discovered that even in the absence of a colorant, the liquid parting agent emulsion dries clear. Traditionally, coating compositions for roofing materials include a colorant to mask a cloudy/opaque appearance and to allow for an aesthetically pleasing finish. As the liquid parting agent emulsion dries clear, there is no need to any additional colorant, although such is optional.

In one or more embodiments, the liquid parting agent emulsion may be described as a percent weight of the solids (i.e. total solids) based on the total weight of the liquid parting agent emulsion. In one or more embodiments, the liquid parting agent emulsion may include about 15% to about 40% total solids, in other embodiments, about 20% to about 35% total solids, and in other embodiments about 25% to about 33% total solids, and in other embodiments, about 27% to about 30% total solids, based on the total weight of the liquid parting agent emulsion.

In some exemplary embodiments, the liquid parting agent emulsion is free of any ingredients other than a thermoplastic polymer (grafted or non-grafted); a mineral filler, and a surfactant. In some exemplary embodiments, the liquid parting agent emulsion is free of any ingredients other than a thermoplastic polymer (grafted or non-grafted); a mineral filler, and a colorant.

The liquid parting agent emulsion may be applied to the roofing material using a variety of application methods. For example, the liquid parting agent emulsion may be applied to the roofing material by spraying, curtain coating, roll coating, flood coating, reverse roll coating, or another suitable application method. In some exemplary embodiments, the emulsified coating is applied to the roofing material as liquid, such as in a plurality of droplets. As the droplets are applied to a hot asphalt composition, the droplets coalesce to form a cohesive coating layer atop the asphalt compositing. As the liquid parting agent emulsion comprises water as a carrier, the application of the liquid parting agent emulsion to a hot asphalt coating composition causes the water in the liquid parting agent emulsion to flash off or otherwise vaporize, such that the particles in the liquid parting agent emulsion coalesce, leaving a residual layer of coalesced coating composition on the surface of the roofing material.

In one or more embodiments, the liquid parting agent emulsion may be described by the coating weight. In one or more embodiments, the liquid parting agent emulsion may be applied at a coating weight of about 90 to about 500 g/100 sq. ft., including about 93 to about 465 g/100 sq. ft.

In one or more embodiments, the liquid parting agent comprises a carrier and a parting material dispersed in the carrier. Suitable carriers for the liquid-applied parting agent of the present disclosure include, but are not limited to, water, a wax, an oil, and asphalt. The parting material for the liquid-applied parting agent of the present disclosure may be a metal stearate, a polyolefin, and combinations thereof. Suitable metal stearates include, but are not limited to, zinc stearate, calcium stearate, and magnesium stearate. Suitable polyolefins include, but are not limited to, polyethylene and polypropylene. The polyolefins or other polymers can be finely ground and suspended in the carrier.

The amount of parting material and carrier in the liquid-applied parting agent may vary widely. In certain embodiments, the liquid-applied parting agent comprises from 1% to 40% by weight parting material and from 60% to 99% by weight carrier. In certain embodiments, the liquid-applied parting agent comprises from 5% to 35% by weight parting material and from 65% to 95% by weight carrier. In certain embodiments, the liquid-applied parting agent comprises from 10% to 30% by weight parting material and from 70% to 90% by weight carrier. In certain embodiments, the liquid-applied parting agent comprises from 15% to 25% by weight parting material and from 75% to 85% by weight carrier. In certain embodiments, the liquid-applied parting agent comprises from 1% to 20% by weight parting material and from 80% to 99% by weight carrier. In certain embodiments, the liquid-applied parting agent comprises from 3% to 15% by weight parting material and from 85% to 97% by weight carrier. In certain embodiments, the liquid-applied parting agent comprises from 3% to 10% by weight parting material and from 90% to 97% by weight carrier.

In certain embodiments, the liquid-applied parting agent comprises water and a metal stearate dispersed in the water or other carrier. In certain embodiments, the liquid-applied parting agent comprises water and zinc stearate dispersed in the water. In certain embodiments, the liquid-applied parting agent comprises water and calcium stearate dispersed in the water. In certain embodiments, the liquid-applied parting agent comprises water and magnesium stearate dispersed in the water. The amount of metal stearate in the liquid-applied parting agent may vary widely. In certain embodiments, the liquid-applied parting agent comprises from 1% to 40% by weight metal stearate and from 60% to 99% by weight carrier. In certain embodiments, the liquid-applied parting agent comprises from 5% to 35% by weight metal stearate and from 65% to 95% by weight carrier. In certain embodiments, the liquid-applied parting agent comprises from 10% to 30% by weight metal stearate and from 70% to 90% by weight carrier. In certain embodiments, the liquid-applied parting agent comprises from 15% to 25% by weight metal stearate and from 75% to 85% by weight carrier.

In certain embodiments, the liquid-applied parting agent comprises water and a polyolefin dispersed in the water or other carrier. In certain embodiments, the liquid-applied parting agent comprises water and polyethylene dispersed in the water. In certain embodiments, the liquid-applied parting agent comprises water and polypropylene dispersed in the water. The amount of polyolefin in the liquid-applied parting agent may vary widely. In certain embodiments, the liquid-applied parting agent comprises from 3% to 10% by weight polyolefin, and from 90% to 97% by weight carrier.

The liquid-applied parting agent may be applied to the shingle using a variety of application methods. For example, the liquid parting agent emulsion may be applied to the roofing material by spraying, curtain coating, roll coating, flood coating, reverse roll coating, or another suitable application method.

When the liquid-applied parting agent is applied to the shingle during the manufacturing process, a layer of the parting material is formed on the shingle. For example, when a liquid-applied parting agent that comprises water as a carrier is applied to the hot asphalt coating of the shingle, the water in the liquid-applied parting agent flashes off or otherwise vaporizes, leaving a residual layer of parting material on the asphalt coating of the shingle. For liquid-applied parting agents that comprise a wax, an oil, or asphalt as the carrier, the carrier tends to be absorbed by or penetrate into the hot asphalt coating of the shingle, leaving a residual layer of parting material on the asphalt coating of the shingle.

In one or more embodiments, the liquid parting agent may be applied as a surface coating on a roofing underlayment. Roofing underlayments of the present disclosure include a layer of liquid parting agent instead of, or in addition to, a conventional parting-agent layer. Although the below exemplary embodiments will be discussed in terms of an liquid parting agent emulsion, it should be appreciated that any of the above-described liquid parting agents may be used in addition to or in the alternative.

Referring now to FIG. 1, an exemplary roofing underlayment 100 of the present disclosure is shown. The roofing underlayment 100 includes a substrate or fibrous mat 102 that has an upper surface 106 and a lower surface 108. At least one surface of the fibrous mat is impregnated or saturated with a first asphalt coating composition 110. For instance, the first asphalt coating composition 110 may be applied to the lower surface 108 of the substrate, which at least partially or fully infiltrates and saturates the fibrous mat 102. The upper surface 106 may optionally be scraped or otherwise texturized and then the upper surface and/or lower surface may be coated with a liquid parting agent, such as the subject liquid parting agent emulsion 114. Conventional parting agents, including sand, talc, or fine mineral aggregates may be applied in addition to the liquid parting agent, if desired.

The roofing underlayment may further include a removable release liner adhered to a lower surface of the asphalt coated substrate (not shown). The removable release liner may be formed of polypropylene, polyethylene, polyester, or other such polymer composition and have a thickness ranging from 40 to 80 microns. The release liner may be treated with an adhesive on one side (the side that comes in contact with asphalt composition) and is applied to at least one of the upper and lower surface of the coated self-adhesive compound to prevent sticking of adjacent sections of the roofing material and to the packaging when the finished membrane is stored and transported in the form of rolls.

Figure 2:
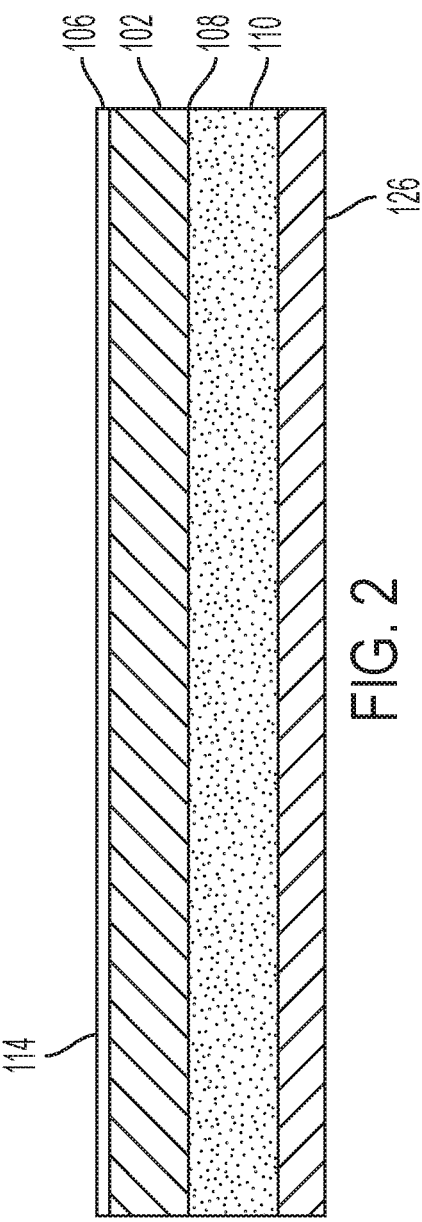
FIG. 2 is a side elevational view of a roofing underlayment comprising multiple layers of an asphalt coating composition.

The roofing underlayment may comprise one or more additional layers of asphalt, each having the same or different compositions than the first asphalt composition. For example, as illustrated in FIG. 2 an exemplary multilayered roofing underlayment 120 of the present disclosure is shown. The roofing underlayment 120 includes a fibrous mat or substrate 102 that has an upper surface 106 and a lower surface 108. The fibrous mat 102 is impregnated with a first asphalt coating composition 110. A second asphalt coating composition 126 may optionally be applied to the first asphalt coating composition 110. The second asphalt coating composition 126 may have the same or different composition as the first asphalt coating composition 110. In some exemplary embodiments, the roofing underlayment comprises only the first asphalt composition or only the second asphalt composition. In other exemplary embodiments, the roofing underlayment comprises both the first asphalt composition and the second asphalt composition.

Suitable substrates for use in the roofing underlayment may be any type known for use in reinforcing asphalt-based roofing materials, such as a web, scrim or felt of fibrous materials such as mineral fibers, polymer fibers, cellulose fibers, rag fibers, glass fibers, natural fibers, synthetic fibers, or mixtures thereof. In certain embodiments, the substrate is a nonwoven web of glass fibers, polymer fibers, or a mixture of glass and polymer fibers. The substrate may be any conventional substrate used in asphalt shingles, roll roofing, low-slope membranes, and the like. Although the substrate is often referred to herein as a fibrous mat, it should be appreciated that any suitable substrate may be used.

The asphalt coating composition can be applied to the substrate in any suitable manner. For example, the substrate can be submerged in the asphalt or the asphalt can be rolled on, sprayed on, or applied to the substrate by other means. The asphalt coating composition may comprise any type of bituminous material suitable for use on a roofing material, such as asphalts, tars, pitches, or mixtures thereof. The asphalt can be either a manufactured asphalt produced by refining petroleum or a naturally occurring asphalt.

In some exemplary embodiments, the asphalt coating composition comprises various types or grades of asphalt, including flux, paving grade asphalt blends, propane washed asphalt, and/or blends thereof. Effective blends of asphalt or bituminous materials are understood by those of ordinary skill in the art. Traditional parting agent compositions required the use of oxidized or otherwise modified asphalt compositions that are "less sticky" than paving grade asphalt or asphalt flux. However, the emulsified parting agent composition disclosed herein may be used with asphalt compositions that are more sticky and softer than such oxidized or modified asphalt materials. Accordingly, in some exemplary embodiments, the asphalt material has the advantage of being prepared using a wide array of asphalt materials, such as different types of paving-grade and/or flux asphalts used independently or as a mixture with various types of asphalt, such as, for example, solvent extracted asphalt, naturally occurring asphalt, synthetic asphalt, and recycled asphalt. Typical paving-grade asphalts are straight run asphalts derived from the atmospheric and vacuum distillation of crude oils, or are made by blending vacuum tower residua with residua from solvent de-asphalting units or re-refined motor oil bottoms or other recycled streams.

By "paving grade asphalt," as used herein, it is meant an asphalt that has a softening point within the range of about 105° F. to about 130° F. and a penetration value of at least about 25 dmm, such as about 60 to 85 dmm. The absolute viscosity of paving grade asphalt is generally about 1000 to 2,500 P at 140° F. By "flux," as used herein, it is meant an asphalt that has a softening point within the range of about 80 to 100° F. and a penetration of greater than 330 dmm. Flux has an average viscosity between about 100 and 500 P at 140° F. Paving grade and flux asphalts are not typically used in roofing applications because such asphalts are not able to achieve the properties required to be considered "coating grade" asphalt, as defined by ASTM D 3462: a softening point from 190° F. (88° C.) to 235° F. (113° C.) and a penetration at 77° F. (25° C.) of 15 to 25 decimillimeter (dmm).

In some exemplary embodiments, the asphalt material includes at least a paving-grade asphalt. Any suitable paving-grade asphalt(s) can be used, for example paving asphalts which meet the PG64/22 specifications (AASHTO M320). PG64/22 is the most common paving specification in the United States. Paving asphalts were previously graded by viscosity and a common asphalt that is similar to the PG64/22 grade asphalt and also usable in this method, is the old AC20 grade asphalt (ASTM D 3381). Other examples of suitable paving-grade asphalts include PG 67/22, PG 70/22, PG 58/22, PG 58/28, PG 58/22, PG 70/16, PG 70/10, PG 67/10, pen grade 40/50, pen grade 60/70, pen grade 85-/100, pen grade 120/150, AR4000, AR8000, and AC/30 grade.

As non-coating grade asphalts, such as paving-grade asphalt and flux, have softening points, penetration values, and melt-viscosities that are not optimal for coating compositions, such, non-coating grade asphalt will often be oxidized or air-blown to raise the softening point, lower the penetration value, and raise the melt viscosity, so that the asphalt can be used for coating roofing products. This air-blowing process oxidizes the asphalt. The use of oxidized asphalt with polymer additives, however, has a number of drawbacks. First, oxidized asphalt does not react well with some polymers, such as SBS, and is thus often not suitable in polymer-modified asphalt compositions. Thus, in some exemplary embodiments, the asphalt in the present invention is not oxidized. In other exemplary embodiments, the asphalt is no greater than 50% oxidized, such as no greater than 30% oxidized, no greater than 20% oxidized, no greater than 10% oxidized, no greater than 5% oxidized, and no greater than 1% oxidized.

In some exemplary embodiments, the non-oxidized asphalt coating composition has a softening point between about 210 to about 230° F., a penetration value at 77° F. between about 20 to 60 dmm, and a melt viscosity at 350° F. of about 600 to 1000 cP. In contrast, an oxidized (i.e., comprising at least partially oxidized asphalt) asphalt composition provides a softening point of 230 to 250° F., a penetration of 15 to 40 dmm, and a melt viscosity at 350° F. of about 2,000 to 5,000 cP.

The asphalt composition may include various additives and/or modifiers, such as inorganic fillers or mineral stabilizers, organic materials such as polymers, recycled streams, ground tire rubber, carbon black, oil, wax, and so forth. In certain embodiments, the asphalt coatings comprise asphalt and inorganic fillers or mineral stabilizers.

In some exemplary embodiments, the filler comprises a filler of finely ground inorganic particulate matter, such as ground limestone, dolomite or silica, talc, sand, cellulosic materials, fiberglass, calcium carbonate, or combinations thereof. In some exemplary embodiments, the filler is included in at least 10 wt. %, based on the total weight of the asphalt coating composition. In some exemplary embodiments, the filler is included in about 15 wt. % to about 80 wt. %, including about 20 wt. % to about 75 wt. %, about 25 wt. % to about 70 wt. % and about 30 to about 65 wt. %, based on the total weight of the asphalt coating composition. In some exemplary embodiments, the asphalt coating composition further comprises various oils, fire retardant materials, and other compounds conventionally added to asphalt coating compositions for roofing applications.

In some exemplary embodiments, one or more additives are added to the asphalt coating compositions, including one or more polymer additives. The polymer additive(s) may include any suitable polymer, or any suitable mixtures of different polymers. In some exemplary embodiments, the polymer additive comprises an elastomeric radial or linear polymer. In some exemplary embodiments, the polymer additive comprises a copolymer such as a linear or radial copolymer. In some embodiments the polymer additive comprises one or more of atactic polypropylene (APP), isotactic polypropylene (IPP), styrene-butadiene block copolymer (SBS), chloroprene rubber (CR), natural and reclaimed rubbers, butadiene rubber (BR), acrylonitrile-butadiene rubber (NBR), isoprene rubber (IR), styrene-polyisoprene (SI), butyl rubber, ethylene propylene rubber (EPR), ethylene propylene diene monomer rubber (EPDM), polyisobutylene (PIB), chlorinated polyethylene (CPE), styrene ethylene-butylene-styrene (SEBS), and vinylacetate/polyethylene (EVA). In other exemplary embodiments, the polymer additive comprises a linear polymer or a combination of linear and radial polymers, such as, for example, radial SBS polymers and SB diblock polymers. Examples of polymer modifiers are also disclosed in U.S. Pat. No. 4,738,884 to Algrim et al. and U.S. Pat. No. 3,770,559, to Jackson, the contents of which are incorporated herein by reference in their entirety. In some exemplary embodiments, the asphalt coating composition includes styrene-butadiene styrene block copolymer (SBS).

In some exemplary embodiments, the polymer additive is included in the asphalt coating composition in an amount from about 0.5 wt. % to about 20.0 wt. %, based on the total weight of the asphalt coating. In some exemplary embodiments, the polymer additive is included in an amount from about 1.0 to about 15.0 wt. %, or from about 1.5 to about 10.0 wt. %, or from about 2.0 to about 7.0 wt. %, or from about 3.0 to about 6.0 wt. %, based on the total weight of the asphalt coating composition. Various exemplary embodiments may include a mixture of two or more polymer additives, such as, for example, a radial SBS polymer and a SB diblock polymer. In such embodiments, the radial SBS polymer may be present in the asphalt coating composition in an amount from about 1.0 to about 10 wt. %, including about 1.5 to about 8 wt. %, about 2.0 to about 7.5 wt. %, about 2.5 to about 7.3 wt. %, and about 2.0 to about 7.0 wt. %. The SB diblock polymer may be present in the asphalt coating composition in an amount from 0 to about 8.0 wt. %, including about 0.5 to about 6.0 wt. %, about 1.0 to about 5.0 wt. %, about 1.3 to about 4.5 wt. %, and about 1.5 to about 4.0 wt. %.

In some exemplary embodiments, the asphalt coating composition may include a secondary additive. The secondary additive may be a viscosity reducing agent, such as one or more of an oil, wax, a fatty acid ester, a fatty acid ester salt, and/or a fatty acid amide.

Any type of wax, or a mixture of different waxes, capable of functioning as described herein can be used in the method. In one exemplary embodiment, the wax has a high congealing point or a high drop melt point of at least about 75° C., specifically at least about 90° C., and more specifically at least about 100° C. When referring to wax testing, the term "melt point" refers broadly to either congealing point or drop melt point, which are defined by ASTM D 938 in the case of congealing point and ASTM D 3954 in the case of drop melt point. Also, wax can be characterized by penetration or hardness (ASTM D5 or ASTM D 1321), density (ASTM D1505), viscosity (ASTM D 4402 or ASTM D88), or acid value (ASTM D 1386).

In some exemplary embodiments, the wax is one or more of a paraffin wax and a non-paraffin wax. Paraffin waxes typically have melting points below 70° C. and have less than 45 carbon atoms. Non-paraffin waxes typically have melting points above 70° C. and have more than 45 carbon atoms. The non-paraffin wax can be one or more of a natural wax, a modified natural wax, a partial synthetic wax, and a full synthetic wax. Non-limiting examples of suitable partial and fully synthetic waxes include ethylene bis-stearamide wax (EBS), Fischer-Tropsch wax (ET), oxidized Fischer-Tropsch wax (FTO), stearic acid pitch, polyolefin waxes such as polyethylene wax (PE), linear low density polyethylene (LLDPE), oxidized polyethylene wax (PEO), polypropylene wax, polypropylene/polyethylene wax, alcohol wax, silicone wax, petroleum waxes such as microcrystalline wax, and chlorinated wax. Any suitable mixtures of different waxes can also be used. For example, the wax can include a blend of a Fischer-Tropsch wax and a polyethylene wax. In some exemplary embodiments, the wax is a non-paraffinic wax with a high melting point (greater than 70° C.). In various exemplary embodiments, the wax has a melting point of at least 100° C., such as at least 120° C., or at least 130° C., or at least 140° C.

In some exemplary embodiments, the wax is a naturally occurring wax can be derived from a plant, animal or mineral. Some examples of natural waxes that may be suitable include plant waxes such as candelilla wax, carnauba wax, rice wax, Japan wax and jojoba oil; animal waxes such as beeswax, lanolin and whale wax; and mineral waxes such as montan wax, ozokerite and ceresin.

In some exemplary embodiments, the secondary additive may comprise, for example, a thermoplastic hydrocarbon resin produced by polymerization of unsaturated hydrocarbons. The thermoplastic hydrocarbon resin may comprise a C5-C9 hydrocarbon resin. In some exemplary embodiments, the thermoplastic hydrocarbon resin comprises an aliphatic hydrocarbon resin (C5), produced from monomers such as, for example, cis/trans 1,3-pentadienes, 2-methyl-2-butene, cyclopentene, cyclopentadiene, and dicyclopentadiene. These monomers are polymerized to oligomeric resins with low to high softening point using Lewis acid catalysts. C5 resins are aliphatic in nature and are, therefore, fully compatible with natural rubber, most olefins (LDPE) and many synthetic elastomers of low polarity. In some exemplary embodiments, the thermoplastic hydrocarbon resin comprises an aromatic hydrocarbon resin (C9), produced from base monomers, such as, for example, indene, methyindenes, dicyclopentadiene, styrene, alpha-methylstyrene and various vinyl toluenes.

In some exemplary embodiments, the secondary additive is included in the asphalt coating in an amount from about 0 to about 5.0 wt. %, based on the total weight of the asphalt coating composition. In some exemplary embodiments, the secondary additive is included in an amount from about 0.3 to about 4.0 wt. %, about 0.5 to about 3.0 wt. %, about 0.8 to about 2.5 wt. %, or from about 1.0 to about 2.3 wt. %, based on the total weight of the asphalt coating composition.

In one or more embodiments, the liquid parting agent emulsion may be applied to an exposed surface of a shingle. As illustrated in FIG. 3, a shingle 200 generally comprises a substrate 216 that is fully or partially impregnated with asphalt, forming a first asphalt coating 214 on the top surface of the substrate and a second asphalt coating 218 on the bottom surface of the substrate. The shingle may further comprise a surface layer of granules 212 embedded in the first asphalt coating 214. A layer of the liquid parting agent emulsion 220 may then be applied to an exposed surface of the shingle, such as to a bottom surface of the second asphalt coating 218. The first asphalt coating 214 is positioned above the substrate 216 when the shingles are installed on a roof and the second asphalt coating 218 is positioned below the substrate when the shingles are installed on the roof. The liquid parting agent emulsion prevents the finished roofing shingle from sticking to itself on a take-up spool, for example, or sticking to other manufacturing equipment during subsequent manufacturing, or in a stack of bundled shingles.

A shingle may also comprise one or more sheets laminated together to form a laminated shingle. For example, as illustrated in FIG. 4, a shingle 250 comprises an upper or overlay sheet 260 attached to a lower or underlay sheet 280 with an adhesive 252 to form the laminated shingle. The overlay sheet 260 extends the full width of the shingle 250 and includes cutouts defining tabs on a front tab portion of the shingle (not shown). An optional release paper covered adhesive strip (not shown) may be disposed on a lower or rear surface of the overlay sheet 260 along a rear headlap portion of the shingle 250. Similar to the shingle 200, each sheet generally comprises a substrate 216, a first asphalt coating 214 on the top surface of the substrate, a second asphalt coating 218 on the bottom surface of the substrate, and a layer of the liquid parting agent emulsion 220 applied to the second asphalt coating. A surface layer of granules 212 may further be embedded in the first asphalt coating.

Figure 5:
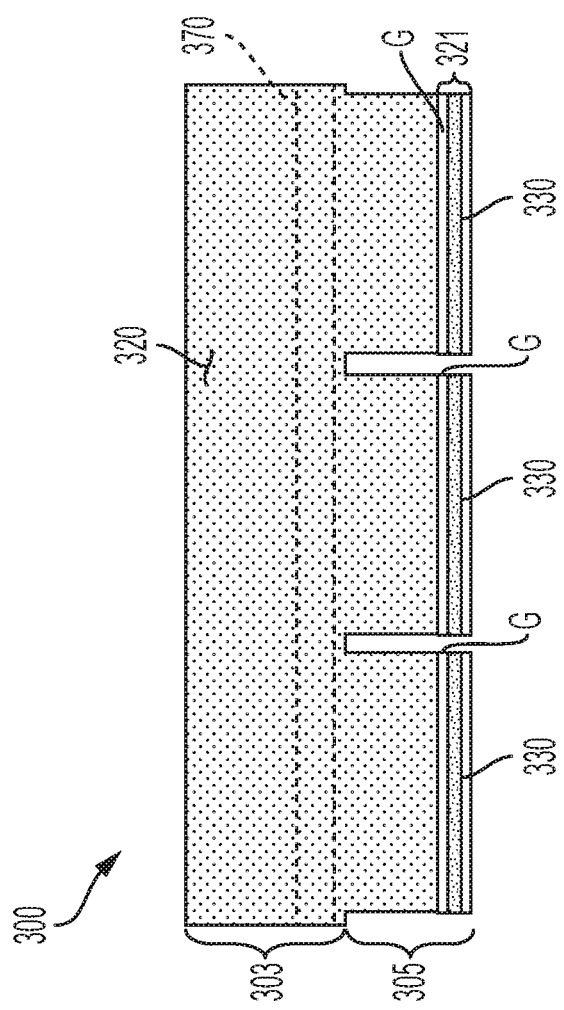
FIG. 5 is a bottom plan view of an exemplary embodiment of a shingle of the present disclosure.

Referring now to FIG. 5, an exemplary single layer tabbed shingle 300 of the present disclosure is shown that includes a layer of liquid parting agent emulsion 320. The shingle 300 includes a substrate that is impregnated with asphalt forming a first asphalt coating on the top surface of the substrate and a second asphalt coating on the bottom surface of the substrate, and a surface layer of granules embedded in the first asphalt coating. The layer of liquid parting agent emulsion may be applied to the second asphalt coating on the bottom surface of the substrate. The shingle 300 has a headlap portion 303, a slotted or discontinuous tab portion 305, and an adhesive 330 applied to a bottom surface of the tab portion 305 of the shingle 300. Although the adhesive 330 is shown as a continuous strip on each tab of the shingle 300, the adhesive 330 may be applied in various forms and configurations including, but not limited to, dots, discontinuous segments, or combinations thereof. In some exemplary embodiments, the liquid parting agent emulsion may be applied to the top surface of a substrate along the headlap portion 330 of the shingle 300. In such embodiments, the headlap portion 330 would be free or substantially free of granules.

One or more portions of the shingle 300 may optionally comprise a reinforcement layer 370 (shown in phantom), In certain embodiments, the reinforcement layer 370 may be attached to the asphalt coating, e.g., by the adhesive mixture of the asphalt coating or other adhesives. In certain embodiments, the reinforcement layer 370 may be a polymeric layer formed from, for example, a polyester, polyolefin (e.g., polypropylene, polyethylene), or the like. However, the reinforcement layer 370 may be formed from other materials, such as, for example, paper, film, scrim material, and woven or non-woven glass.

For example, in certain embodiments, the shingle may include a reinforcement layer 370 comprising strip of woven polyester material applied to the surface of the shingle after application of the asphalt coating, such that the asphalt material penetrates the strip between the woven fibers of the polyester fabric, to embed the strip of material in the base asphaltic layer and secure the strip to the shingle. The polyester strip may be applied prior to the granule coating of the shingle, and the granules may not adhere to the strip-covered portion of the shingle. The strip of polyester material may, for example, define a shingle nail zone and provide reinforcement for the nailed portion of the shingle.

Still referring to FIG. 5, different amounts, thicknesses and/or concentrations of liquid parting agent emulsion can be applied to different areas of the shingle. For example, a lower thickness, amount, and/or concentration (percent solids) of liquid parting agent emulsion can be applied in the area 321 before the adhesive 330 is applied to the shingle. The amount, thickness, and/or concentration is sufficient to prevent the area 321 from sticking to rolls and other contact surfaces in the shingle production equipment and is low enough that the layer of emulsified coating in the area 321 does not interfere with the application or the functioning of the adhesive 330.

Still referring to FIG. 5, in another embodiment, the entire back surface of the shingle is coated with the same amount of liquid parting agent emulsion 320 and the area 321 is treated to promote adhesion of the sealant 330 to the rear surface of the shingle. Examples of ways that the area 321 can be treated to promote adhesion of the sealant 330 to the rear surface of the shingle include, increasing the coefficient of friction of the area 321 by knurling, cutting, perforation, etching, burning (e.g. laser treatment), and/or removing the liquid parting agent emulsion 320, such as by scraping, burning, etc. Any manner capable of making the area capable of being adhered to by shingle sealant can be used.

Suitable substrates for use in shingles may be any type known for use in reinforcing asphalt-based roofing materials, such as a web, scrim or felt of fibrous materials such as mineral fibers, cellulose fibers, rag fibers, mixtures of mineral and synthetic fibers, or the like. Combinations of materials can also be used in the substrate. In certain embodiments, the substrate is a nonwoven web of glass fibers. The substrate may be any conventional substrate used in asphalt shingles, roll roofing, low-slope membranes, and the like.

The granules are generally deposited onto the asphalt coating after the asphalt coating is applied to the substrate. The shingles may be passed through rollers to further embed the granules into the asphalt coating. The granules may comprise a variety of different materials. The granules may be ceramic roofing grade granules that are made in any known or conventional manner. Any type of roofing granule may be used. The granules may comprise a variety of different particle sizes and colors. Further, a variety of different granules may be blended together, e.g., to provide different color blends or to provide the appearance of varying thickness to the shingle.

Figure 6:
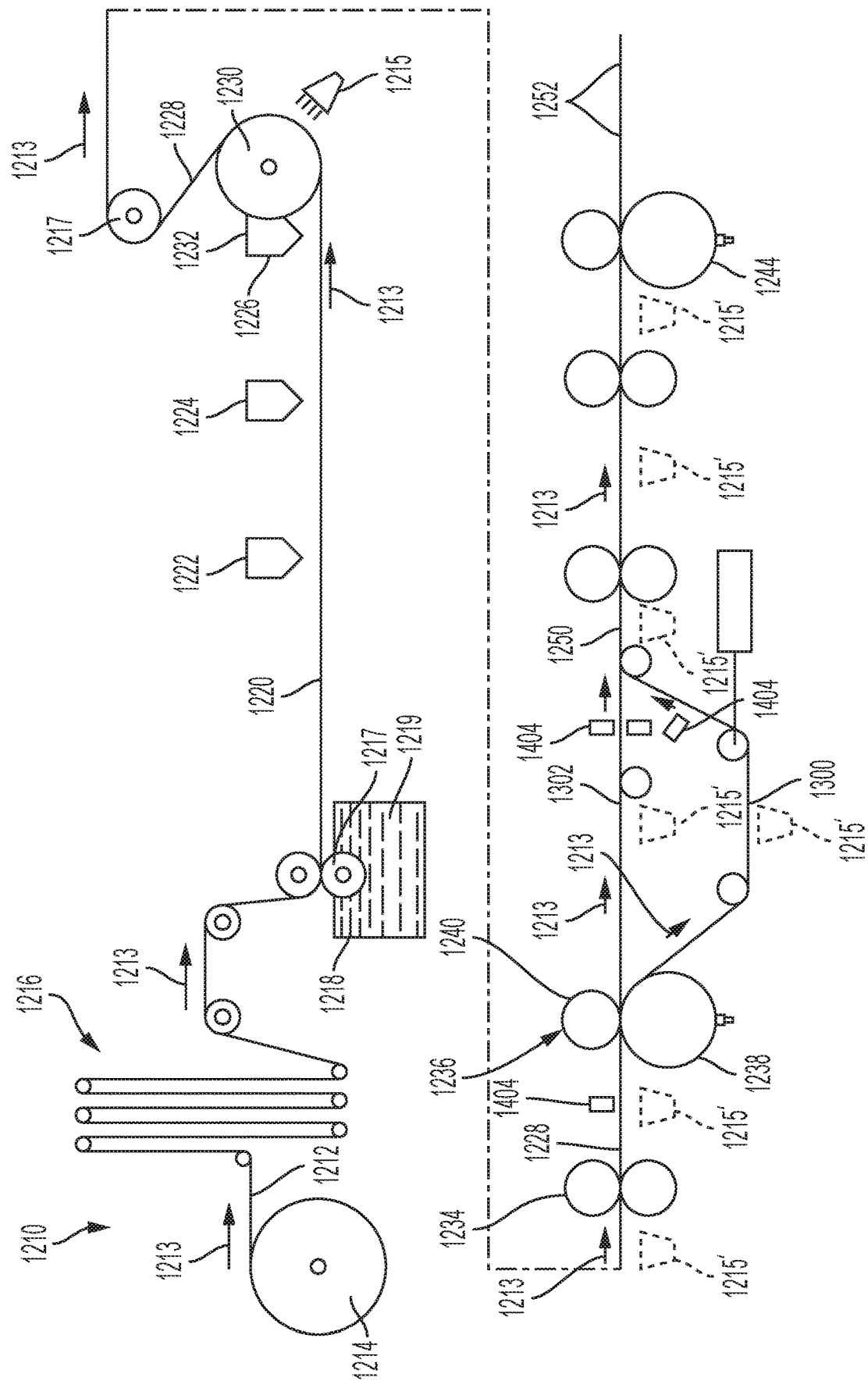
FIG. 6 is a schematic view in elevation of an exemplary embodiment of an apparatus for manufacturing an asphalt-based roofing material of the present disclosure.

Referring now to FIG. 6, an exemplary embodiment of an apparatus 1210 for manufacturing asphalt-based roofing materials using a liquid parting agent emulsion is shown. The apparatus and manufacturing process may be configured in a variety of ways. Any apparatus and process that can manufacture an asphalt-based roofing material with a liquid parting agent emulsion applied to the roofing material may be used.

The illustrated manufacturing process involves passing a continuous sheet of substrate 1212 in a machine direction 1213 through a series of manufacturing operations. The sheet usually moves at a speed of at least about 200 feet/minute (61 meters/minute), and typically at a speed within the range of between about 450 feet/minute (137 meters/minute) and about 800 feet/minute (244 meters/minute). Other speeds, however, may be used.

In a first step of the manufacturing process, the continuous sheet of substrate 1212 is payed out from a roll 1214. The substrate 1212 may be any type known for use in reinforcing asphalt-based roofing materials, such as a nonwoven web of glass fibers. Alternatively, the substrate 1212 may be a scrim or felt of fibrous materials such as mineral fibers, cellulose fibers, rag fibers, mixtures of mineral and synthetic fibers, or the like.

The substrate 1212 is passed from the roll 1214 through an accumulator 1216. The accumulator 1216 allows time for splicing one roll 1214 of substrate to another, during which time the substrate 1212 within the accumulator 1216 is fed to the manufacturing process so that the splicing does not interrupt manufacturing.

Next, the substrate 1212 is passed through a coater 1218 where a coating of the hot, melted asphalt coating composition 1219 is applied to the substrate 1212 to form an asphalt-coated sheet 1220. The asphalt coating composition 1219 may be applied in any suitable manner. In the illustrated embodiment, the substrate 1212 contacts a roller 1217, which is in contact with the supply of asphalt coating composition 1219. The roller 1217 completely covers the substrate 1212 with a tacky coating of asphalt 1219. However, in other embodiments, the asphalt coating composition 1219 could be sprayed on, rolled on, or applied to the substrate 1212 by other means. In one embodiment, the asphalt coating composition 1219 is applied at a temperature of about 350° F. to about 400° F. In another embodiment, the asphalt coating composition 1219 may be applied at a temperature of more than 400° F. or less than 350° F. The substrate 1212 exits the coater 1218 as the asphalt-coated sheet 1220. The asphalt coating composition 1219 on the asphalt-coated sheet 1220 remains hot.

The asphalt-coated sheet 1220 may then be passed beneath one or more granule applicators 1222, 1224, 1226 where colored granules, blend drop granules, shadow granules, headlap granules, and so forth may be applied to one or more portions of the asphalt-coated sheet 1220. The various granules are applied to the extent that the asphalt-coated sheet 1220 becomes completely covered with granules, thereby defining a continuous granule-coated sheet 1228. The granule-coated sheet 1228 is then turned around a slate drum 1230 to press the granules into the asphalt coating and to temporarily invert the sheet 1228. Such inverting of the granule-coated sheet 1228 causes any excess granules to drop off the granule-coated sheet 1228 on the backside of the slate drum 1230. The excess granules are collected by a hopper 1232 of granule applicator 1226 and may be reused. The hopper 1232 is positioned on the backside of the slate drum 1230.

The liquid parting agent emulsion may be applied to an exposed surface of the asphalt coated sheet at any point after the substrate is coated with asphalt (i.e. after the coating apparatus) and before the surface of the asphalt coated sheet comes into contact with another surface of the apparatus 1210 (e.g. the roll 1217 in the illustrated apparatus). The liquid parting agent emulsion prevents the exposed surface of the asphalt coated sheet from sticking to the contact surfaces of the apparatus 1210.

EXAMPLES

The following examples are included for purposes of illustration and are not intended to limit the scope of the methods described herein.

Example 1—Walkability

Figure 7:
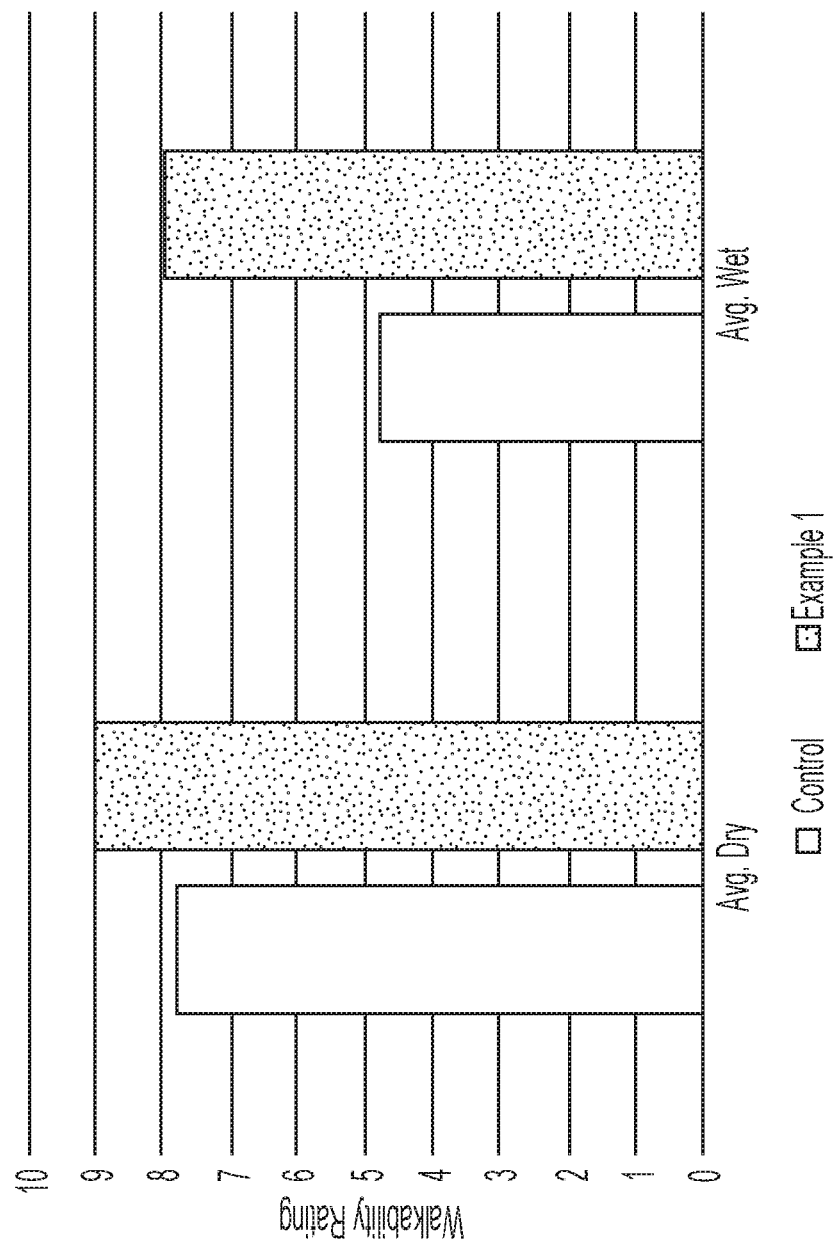
FIG. 7 graphically illustrates the walkability of various roofing underlayments utilizing various asphalt coating compositions and parting agent compositions.

The walkability of various roofing underlayments was tested utilizing various asphalt coating compositions and parting agent compositions. The apparent walkability is tested on a scale of 1 to 10, with higher ratings being indicative of better walkability. A walkability rating below 4 is considered to be too slippery. Comparative Example 1 comprises a fiberglass mat impregnated with an asphalt coating composition comprising only paving grade asphalt and including a layer of talc liquid parting agent. Example 1 utilizes an asphalt coating composition comprising the same paving-grade asphalt as Comparative Example 1, but includes the inventive liquid parting agent emulsion according to the present inventive concepts. However, as shown below in Table 1 and FIG. 7, the exemplary roofing underlayment that included a layer of the liquid parting agent disclosed herein, demonstrated a walkability rating of 8.0 in wet conditions and a walkability rating of 9.0 in dry conditions. In contrast, Comparable Example 1 demonstrated a very low wet walkability rating of 4.8 and a lower dry walkability rating of 7.8. Thus, the roofing underlayments may be formed using "softer" asphalt, rather than the coating grade asphalt utilized in traditional asphalt coating compositions, while providing improved walkability.

TABLE 1

| Underlayment | Dry Walkability Rating | Wet Walkability Rating |
| --- | --- | --- |
| Comparative Example 1 | 7.8 | 4.8 |
| Example 1 | 9.0 | 8.0 |

Example 2

The surface tack/roll sticking of various roofing underlayments was tested utilizing various surface coatings or parting agents. The surface tack levels were tested (grams/force), with lower levels indicating less tackiness. The surface tack was tested at both ambient (75° F.) and hot/humid (140° F.) environments. Additionally, the degree of stickiness (lbs/2 inch) was tested by measuring the total elongation from sticking at both ambient (75° F.) and hot/humid (140° F.) environments. Total elongation values less than 1.0 are considered to have acceptable level of stickiness. Comparative Examples 1-10 comprise asphalt coating compositions comprising coating-grade asphalt, while Example 1 utilizes an asphalt coating composition comprising paving-grade asphalt, thus the asphalt batch is inherently more sticky than in the Comparative Examples. However, as shown below in Table 2, the exemplary roofing underlayment formed using paving-grade asphalt coating and a layer of the liquid parting agent disclosed herein, demonstrated a total tack value below 2.0 grams/force and total elongation value of 0.1 lbs/2 inch in an ambient environment and a total tack value below 80 grams/force and total elongation value of 0.26 grams/force in a hot/humid environment. Such values are comparable, if not improved over many of the conventional compositions utilizing coating-grade asphalt compositions and talc or limestone parting agents.

TABLE 2

| Underlayment | Tack Test (75° F.) (grams/force) | Avg. Total Elongation (75° F.) | Tack Test (140° F.) (grams/force) | Avg. Total Elongation (140° F.) |
|---|---|---|---|---|
| Comp. Example 1 (Talc LPA) | 2.008 | 0.187 | — | — |
| Comp. Example 2 (Talc LPA) | 2.891 | 0.208 | 94.134 | 0.296 |
| Comp. Example 3 (Talc LPA) | 2.093 | 0.205 | 94.012 | 0.263 |
| Comp. Example 4 (Talc LPA) | 1.947 | 0.212 | 62.428 | 0.263 |
| Comp. Example 5 (Talc LPA) | 2.259 | 0.187 | 65.645 | 0.262 |
| Comp. Example 6 (Talc LPA) | 2.176 | 0.158 | 73.017 | 0.265 |
| Comp. Example 7 (Talc LPA) | 2.025 | 0.202 | 61.666 | 0.247 |
| Comp. Example 8 (Talc LPA) | 2.325 | 0.198 | 83.384 | 0.257 |
| Comp. Example 9 (Limestone LPA) | 2.3 | 0.447 | — | — |
| Comp. Example 10 (Limestone LPA) | 6.253 | — | — | — |
| Example 1 | 1.949 | 0.1 | 78.018 | 0.26 |

The above description of specific embodiments has been given by way of example. Any combination or sub-combination of the described shingle features, may be combined to form a roofing material. From the disclosure given, those skilled in the art will not only understand the general inventive concepts and attendant advantages but will also find apparent various changes and modifications to the structures and methods disclosed. For example, the general inventive concepts are not typically limited to any particular roofing application. Thus, for example, use of the inventive concepts to both residential and commercial roofing applications, are within the spirit and scope of the general inventive concepts. As another example, although the embodiments disclosed herein have been primarily directed to asphalt-based roofing shingles, the general inventive concepts could be readily extended to any roofing material which could benefit from the general inventive concepts described herein.

Furthermore, the general inventive concepts could be readily applied to various roofing material designs, such as for example, single layer, three-tab shingles or multi-layer, laminate shingles and roofing underlayments. It is sought, therefore, to cover all such changes and modifications as fall within the spirit and scope of the general inventive concepts, as described and claimed herein, and equivalents thereof

What is claimed is:

1. A roofing membrane comprising:
   at least one substrate at least partially impregnated with a first asphalt coating composition, said substrate having an upper surface and a lower surface; and
   a liquid parting agent emulsion applied to the upper surface of the asphalt-coated substrate, said liquid parting agent emulsion comprising:
   up to about 40 wt. % of a polypropylene emulsion, based on the weight of the total solids in the liquid parting agent emulsion; and
   from about 5 wt. % to about 40 wt. % of at least one mineral filler, based on the weight of the total solids in the emulsion, wherein the at least one mineral filler has an average particle size less than 50 microns,
   wherein the liquid parting agent emulsion is free of thermoset polyurethane polymers,
   wherein said first asphalt coating composition is a non-oxidized coating composition and is free of oxidized asphalt, and
   wherein the non-oxidized coating composition has a softening point of from 210 to 230° F.

2. The roofing membrane of claim 1, wherein the polypropylene emulsion is present in the liquid parting agent emulsion in an amount between about 5 wt. % to about 40 wt. %, based on the weight of the total solids in the liquid parting agent emulsion.

3. The roofing membrane of claim 1, wherein the polypropylene emulsion is present in the liquid parting agent emulsion in an amount between about 6 wt. % to about 30 wt. %, based on the weight of the total solids in the liquid parting agent emulsion.

4. The roofing membrane of claim 1, wherein the liquid parting agent emulsion further includes a wax.

5. The roofing membrane of claim 1, wherein the mineral filler comprises one or more of ground limestone, dolomite, silica, talc, sand, iron salt, titanium, cellulosic materials, fiberglass, calcium carbonate, or combinations thereof.

6. The roofing membrane of claim 1, wherein the liquid parting agent emulsion further includes up to about 3.0 wt. % of a colorant, based on the weight of the total solids in the emulsion.

7. The roofing membrane of claim 6, wherein the colorant includes one or more of iron oxides, mineral oxides, or carbon black.

8. The roofing membrane of claim 1, wherein the first asphalt coating composition comprises at least one of paving-grade asphalt or flux.

9. The roofing membrane of claim 1, wherein the first asphalt coating composition includes at least one polymer additive.

10. The roofing membrane of claim 1, wherein the first asphalt coating composition comprises up to about 5.0 wt. % of a thermoplastic hydrocarbon resin, based on the total weight of the asphalt composition.

11. The roofing membrane of claim 10, wherein the thermoplastic hydrocarbon resin is an aliphatic C5-C9 hydrocarbon resin.

12. The roofing membrane of claim 1, further comprising a second asphalt composition.

13. The roofing membrane of claim 1, wherein said membrane is a roofing underlayment.

14. The roofing membrane of claim 1, wherein the roofing membrane further includes a removable release liner adhered to the lower surface.

15. The roofing membrane of claim 1, wherein the liquid parting agent emulsion consists of the polypropylene emulsion, the at least one mineral filler, and water.

16. A roofing underlayment comprising:
- a substrate at least partially impregnated with a first asphalt coating composition comprising paving-grade asphalt, the substrate having an upper surface and a lower surface, wherein the asphalt coating composition comprises no greater than 5 wt. % oxidized asphalt;
- a liquid parting agent emulsion applied to the upper surface of the asphalt-coated substrate, said liquid parting agent emulsion comprising:
  - up to about 40 wt. % of a polypropylene emulsion, based on the weight of the total solids in the liquid parting agent emulsion; and
  - from about 5 wt. % to about 40 wt. % of at least one mineral filler, based on the weight of the total solids in the liquid parting agent emulsion,
  - wherein the liquid parting agent emulsion is free of thermoset polyurethane polymers; and
- a removeable release liner adhered to the lower surface, wherein the liquid parting agent emulsion is applied at a coating weight of about 90 g/100 sq. ft to about 500 g/100 sq. ft.

17. The roofing underlayment of claim 16, wherein the liquid parting agent emulsion consists of the polypropylene emulsion, the at least one mineral filler, and water.

* * * * *